United States Patent
Schiffner

[11] 4,035,742
[45] July 12, 1977

[54] DEVICE FOR OPTICAL PUMPING SOLID STATE LASERS

[75] Inventor: Gerhard Schiffner, Neuried, Germany

[73] Assignee: Siemens Aktiengesellschaft, Berlin & Munich, Germany

[21] Appl. No.: 663,742

[22] Filed: Mar. 4, 1976

[30] Foreign Application Priority Data

Mar. 7, 1975 Germany .......................... 2510030

[51] Int. Cl.² ........................................ H01S 3/091
[52] U.S. Cl. .......................... 331/94.5 P; 350/96 C
[58] Field of Search ................. 331/94.5; 330/4.3; 350/96 WG, 96 C

[56] References Cited

U.S. PATENT DOCUMENTS

| | | | |
|---|---|---|---|
| 3,284,722 | 11/1966 | Gray | 331/94.5 P |
| 3,316,500 | 4/1967 | Newman | 331/94.5 P |
| 3,753,145 | 8/1973 | Chesler | 331/94.5 P |

*Primary Examiner*—William L. Sikes
*Attorney, Agent, or Firm*—Hill, Gross, Simpson, Van Santen, Steadman, Chiara & Simpson

[57] ABSTRACT

A device for optically pumping a solid state laser consisting of a rod of a laser material, and at least one light pumping source having a point form or shape characterized by a waveguide arranged between each pumping light source and the laser rod for coupling the pumping light into the rod. Preferably, the waveguides are either glass rods or a prism and the optical axis of the waveguide extends at an angle $\delta$ with a normal to a flat surface of the rod of laser material which angle $\delta$ has a relation of $2 \arcsin(1/n_1) \leq \delta < \pi/2$ wherein $n_1$ is the index of refraction of the light waveguide.

4 Claims, 7 Drawing Figures

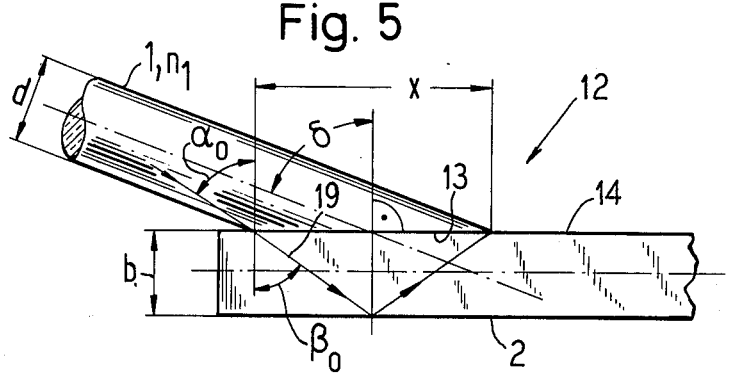
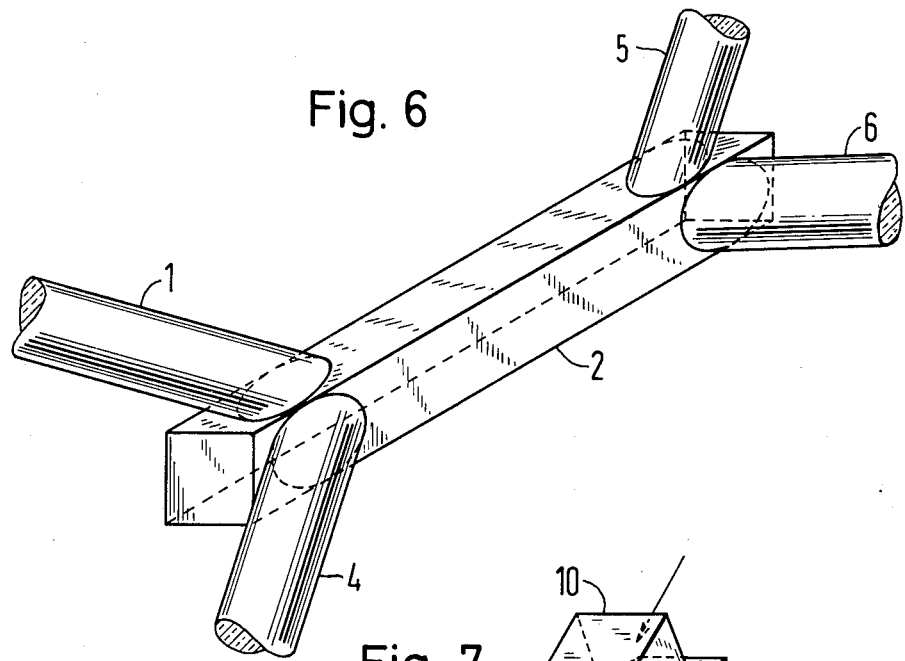
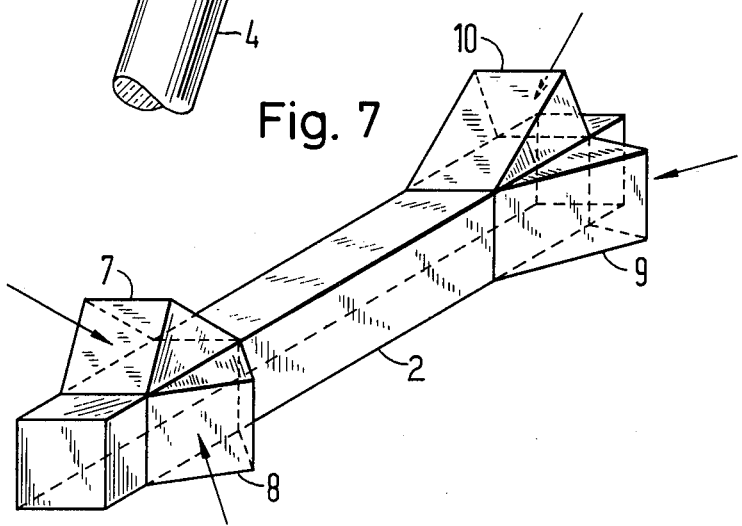

DEVICE FOR OPTICAL PUMPING SOLID STATE LASERS

BACKGROUND OF THE INVENTION

1. Field of the Invention

The present invention is concerned with a pumping arrangement for optically pumping solid state lasers by using at least one pumping light source having a point form or shape. The arrangement is particularly advantageous in all cases in which the diameter of the laser rod is small in comparison to the absorption length for the pumping radiation in the laser material.

2. Prior Art

With the aid of spectrally matched light sources such as light emitting diodes or semiconductor diode lasers, solid state lasers and particularly YAG:Nd$^{3+}$ lasers may be pumped. Utilizing such a pumping arrangement, continuous operation at 77 K as well as at room temperature was desired.

In case of the known arrangements, laser crystals or rods are either pumped from the side or pumped from one end. When pumping from the side, only a small portion of the energy supplied can be absorbed because of the small material thickness. Due to the focusing effect caused by round laser rods, the center of the rod is usually more strongly pumped than the edge zones. This occurs even if a large number of pumping diodes is utilized.

When pumping the laser rod by applying the pumping light to one end, nearly the entire light energy is absorbed in the laser rod or crystal and a more homogeneous illumination is obtained. However, the resonator reflector arranged at the end of the laser rod must have a good transmission for the pumping energy. In the case of known arrangements for pumping the end of a laser rod, it has not yet been possible to couple more than one pumping diode and, therefore, the light energy being applied to the rod remains substantially limited.

SUMMARY OF THE INVENTION

The present invention provides a pumping arrangement for optically pumping solid state lasers in which a large number of point source pumping light sources may be coupled to the laser and still obtain the advantage of longitudinal or endwise pumping to produce an increased population inversion in the rod as compared with the known pumping arrangements. To obtain this result, a pumping arrangement having a laser rod and at least one pumping light source having a point form has the improvement of providing a light waveguide between each pumping light source and the laser rod. Preferably, the light waveguide may be either a glass rod or a prism whose optical axis forms an angle δ with a normal to the surface of the laser rod which angle δ is advantageously equal to or somewhat greater than 2 arc sin ($1/n_1$) and is less than $\pi/2$. Thus, the angle δ has the relationship of $$2 \text{ arc sin } (1/n_1) \leq \delta < \pi/2$$

wherein $n_1$ is the index of refraction of the waveguide.

The index of refraction $n_1$ in the waveguide is either equal to or somewhat smaller than $n_2$ which is the index of refraction of the laser rod such as a YAG:Nd$^{3+}$ crystal. The precise optimum value of the angle δ among other things depends upon the angle of distribution of the radiation in the light waveguide and upon the shape of the cross section of the light waveguide.

BRIEF DESCRIPTION OF THE DRAWINGS

FIGS. 4 and 5 illustrate the light paths during coupling between a light waveguide and laser rod; and FIGS. 6 and 7 illustrate two additional embodiments of the present invention using several light pumping sources.

DESCRIPTION OF THE PREFERRED EMBODIMENT

Figure 2:
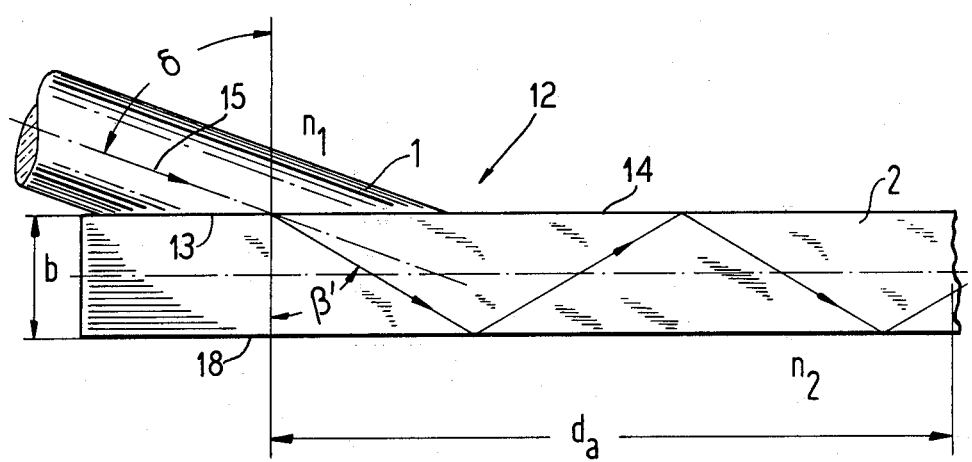
FIG. 2 illustrates a first embodiment of a pumping arrangement in accordance with the present invention.
Figure 4:
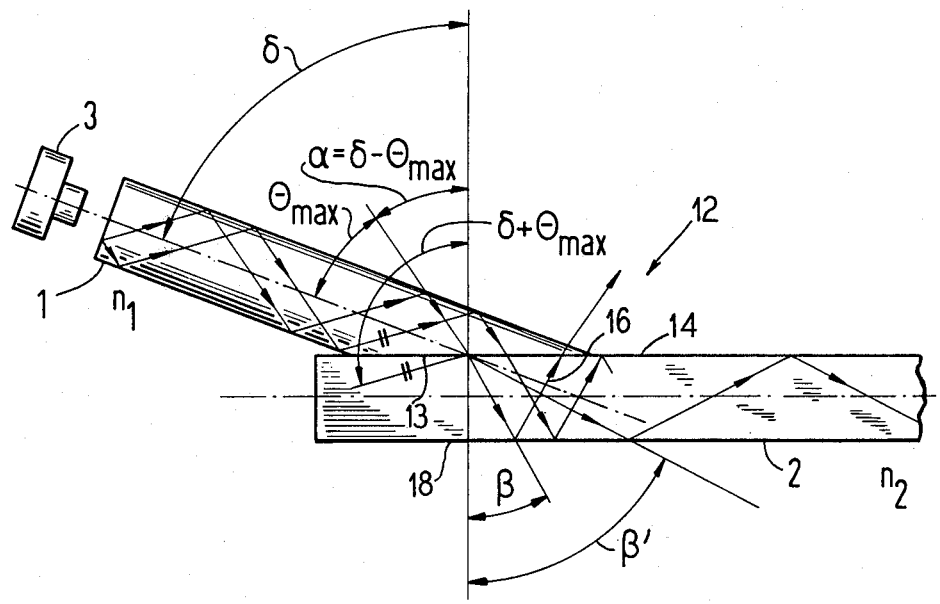

The principles of the present invention are particularly useful in a pumping arrangement generally indicated at 12 in FIGS. 2 and 4 for pumping a solid state laser rod 2 such as a YAG:Nd$^{3+}$ crystal having a square cross section with pumping energy from a point source such as a light emitting diode 3.

Figure 1:
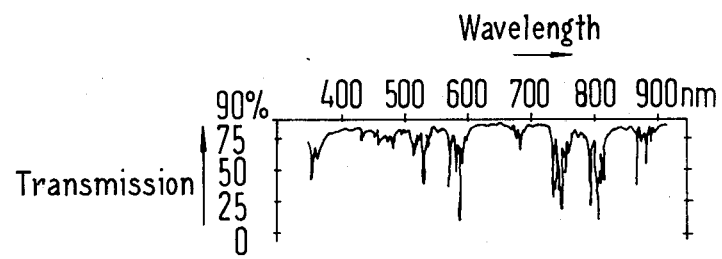
FIG. 1 illustrates an absorption spectrum of a YAG:Nd$^{3+}$ laser.

The absorption spectrum of a YAG:Nd laser, which has a doping of 0.725 percent by weight of Nd and has a crystal thickness of 3 mm is illustrated in FIG. 1. Strong absorption bands are recognized at λ = 880 nm, 810 nm and 750 nm. The band at 810 nm is best suited for pumping with light emitting diodes which are available on account of the small absorption length of approximately $a = 4.3$ mm. The index of refraction of a YAG material at 810 nm is $n_2 = 1.8243$ and at a laser wavelength of λ = 1.0641 μm, the index of refraction is $n_2 = 1.818$.

An embodiment of the pump arrangement 12 in accordance with the present invention is illustrated in FIG. 2. The pump radiation is first coupled into a glass rod 1 which acts as a light waveguide. This glass rod is optically coupled to the YAG crystal 2 which has a square cross section and has the index of refraction of $n_2$ in the manner illustrated. For example, an end face 13 of the rod 1 is attached to a surface 14 by using, for example, Canadian balsam so that the glass rod 1 describes an angle relative to the normal of a surface 14 of the YAG crystal. This angle δ is selected in such a manner that as large a portion as possible of the light energy, which is coupled into the glass rod 1, is coupled into the YAG crystal and is absorbed therein.

In order that a large portion of the pump radiation reaching the YAG crystal 2 is absorbed therein, care must be taken that the light paths in the crystal are greater than the absorption length. On account of the small crystal dimensions of the crystal 2, this can most easily be achieved by means of multiple reflections which provide an additional advantage of the arrangement. The pump radiation being absorbed in a smaller volume than, for example, by means of radiation in the longitudinal direction without reflection. If it is possible to work with total reflections, this is the simplest and most effective manner of obtaining large absorption.

Thus, it is advantageous to polish the lateral surfaces such as 14 of the crystal 2 to ensure an efficient light coupling into the crystal and to obtain good conditions for total reflection within the crystal. If the angle of incidence within the crystal with respect to the lateral surfaces cannot be kept below the critical or limiting value for total reflection, then the exterior surfaces of the crystal must be provided with a reflecting coating, for example, a gold coating.

In the embodiment illustrated in FIGS. 2 and 4, a YAG crystal 2 with a square cross section is assumed and the pump radiation is supplied via a round glass rod 1. The diameter of the glass rod which forms the waveguide is equal to the width of the surface 14 of the YAG crystal 2. It is also possible to use glass rods with a square cross section, a rectangular cross section, or an elliptical cross section.

In FIG. 2, a beam 15 is illustrated which runs along the axis of the glass rod 1. This direction is the main radiation direction. It is apparent that it is not difficult to have this beam satisfy the requirements for total reflection within the YAG crystal. However, beams also exist in the glass rod which exhibit an angle $\theta$ (FIG. 3) with the axis of the waveguide 1. The angle of incidence $\alpha$ (FIG. 4) relative to the normal of the surface 14 of the YAG crystal 2 is then $\alpha = \delta \pm \theta$. If $\alpha$ satisfies the requirement $\delta < \alpha < \pi/2$, this means that the beam penetrates the crystal 2 at an angle shallower than the angle of the beam 15 illustrated in FIG. 2, no difficulties exist under the condition of $n_1 \leq n_2$.

However, there are often problems for beams with $\alpha < \delta$. For example, the angle $\beta$ in the crystal may be so small that no total reflection will occur. As already stated, this difficulty can be avoided if the crystal is provided with a reflective coating on the outer surface. An additional difficulty occurs if the beam reflected in the YAG crystal is directed to a location at which the light waveguide is in optical contact with the YAG crystal. This light beam is then reflected back into the light waveguide as illustrated in FIG. 4 by beam 16. In such an instance, it can be either totally reflected at the surface of the waveguide 1 or it can also exit the light waveguide 1 as illustrated in the figure. The exiting of the light beam 16, which is reflected from the crystal back into the waveguide, can be prevented by providing a reflective coating on the waveguide 1. According to the arrangement, a beam of this type can either be reflected back into the crystal or can run along the waveguide back toward the diode 3. Since this type of beam is only partially absorbed in the YAG crystal 2, it is desirable to avoid this type of beam.

In order to reduce the portion of the light energy which is only insufficiently utilized in the manner described, the following measures among others must be taken:

a. selection of a favorable angle $\delta$;
b. decrease either $x$ (the length of contact between the surface 13 of the waveguide 1 and crystal 2 in the direction of propagation as illustrated in FIG. 5), or $d$ (thickness of the waveguide as illustrated in FIG. 5) relative to $b$ (the direction of the waveguide normal to the direction of propagation). For example, to use light waveguides with an elliptical or rectangular cross section;
c. coupling a radiation in the light waveguide in such a way that the largest possible portion of the beams runs parallel to the axis of the waveguide; and
d. providing a surface of the YAG crystal 2 and the glass rod of the waveguide 1 with a reflective coating.

Figure 3:
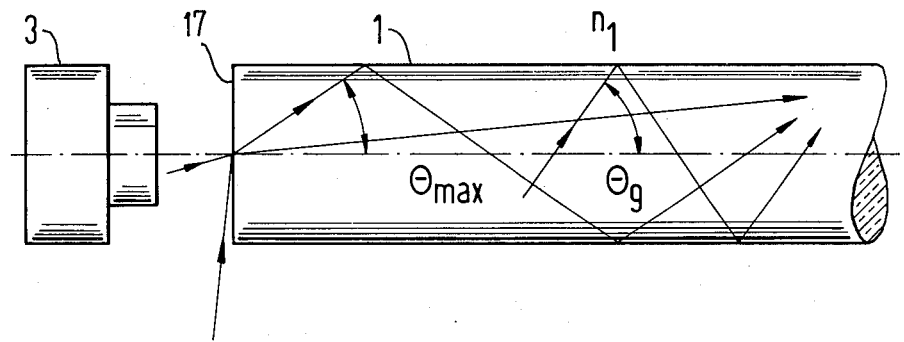
FIG. 3 illustrates various light paths in a light waveguide.

The coupling of radiation of the light emitting diodes 3 into a dielectric waveguide 1 with good efficiency presents certain problems. Probably the simplest method of coupling is illustrated in FIG. 3. The light waveguide 1 has an end surface 17 ground or finished to extend normal to its axis and this end surface 17 is located in the direct vicinity of the diode 3 without an immersion fluid. In this arrangement, it can be shown that the maximum angle $\theta_{max}$ of the light beam in the waveguide 1 relative to its axis (at 90° of incidence) is given by the equation $$\theta_{max} = \arcsin 1/n_1, \tag{1}$$

whereby $n_1$ is the index of refraction of the waveguide 1. However, the critical or limiting angle for total reflection is $$\theta_g = \pi/2 - \arcsin 1/n_1. \tag{2}$$

For a condition of $n_1 > \sqrt{2}$, one contains $\theta_g > \theta_{max}$ and in the following it is assumed that this requirement has been satisfied. Therefore, the largest angle occurring here is equal to $\theta_{max}$. It is assumed that the diode behaves like a Lambert-radiator with a radiation characteristic corresponding to a circle. In consequence of the refraction at the boundary or end surface 17 of light waveguide, the result is a certain alignment of radiation in the direction of the axis. Losses in reflection at the boundary or end surface 17 can be reduced by means of an anti-reflection coating.

Another important type of coupling comprises the production of a close optical contact between the diode 3 and the end surface 17 of light waveguide 1. For example, by using an immersion fluid. The advantage of this type of coupling is that the light is absorbed from nearly the entire semi-infinite space. However, in a light waveguide which has not been provided with a reflective coating, only that portion of the radiation whose angle remains below the critical angle for total reflection, $\theta_g$, is passed into the waveguide. It should be noted that the refraction at the entry or boundary surface is eliminated in this type of coupling and thus radiation angles $\theta$ are increased.

Finally, radiation can be transmitted from the diode 3 to a light waveguide with a lens (not illustrated). When viewed from the diode, this lens appears at an angle which is as large as possible in order that as large a portion as possible of the angular range of radiation from the diode is picked up by the lens and directed into the waveguide.

In FIG. 4, the arrangement for coupling of pump radiation into the YAG crystal 2 is illustrated. First, a determination is made of which smallest angle of incidence $\alpha = \delta - \theta$ still leads to a total reflection within the YAG crystal. In a YAG rod, the following must be valid.

$$\beta \geq \beta_g = \arcsin 1/n_2 \tag{3}$$

whereby $\beta$ is the angle measured relative to the normal on the surface 14 of the YAG rod. From the law of refraction, it follows:

$$\sin(\delta - \theta) = n_2/n_1 \sin \beta \tag{4}$$

and with $\beta = \beta_g$ and from equation (3), the limiting or critical angle $\delta_g$ is obtained $$\delta_g - \theta = \arcsin 1/n_1, \tag{5}$$

whereby $n_2$ drops out.

If the maximum value of $\theta$ according to equation (1) occurs (which is illustrated by the coupling of the radiation in FIG. 3) then the following is obtained with equation (1)

$$\delta_g = 2 \text{ arc sin } 1/n_1 \qquad (6)$$

or $$n_1 = 1/\sin \delta g/2$$

In order that the beam with $\theta = \theta_{max}$ in the YAG crystal can still be totally reflected, $\delta \geq \delta_g$ must be selected. In Table I, the correlation between $\delta_g$ and $n_1$ for some angles and $n_1 \leq n_2$ is illustrated. From this table it can be learned that with available glasses (with the index of refraction $n_1$) angles result which can be easily realized.

Table I

| $\delta_g$ (Degree) | $n_1$ |
|---|---|
| 66.48 | 1.8243* |
| 70 | 1.74 |
| 75 | 1.64 |
| 80 | 1.56 |
| 85 | 1.48 |

*$n_1 = n_2$

If coupling into the light waveguide is carried out in such a manner that the light rays occur which describe a maximum angle $\theta_g$ relative to the axis (coupling with a direct optical contact), then from equations (2) and (5), it follows that $$\delta_g = \pi/2 \qquad (7)$$

Because, in the arrangement under consideration angle $\delta \geq \pi/2$ cannot be realized and $\delta < \pi/2$ always exists, radiation energy is therefore lost from the surface 18 of the YAG crystal which is opposite the coupling location when the surfaces of the YAG crystal were not provided with a reflective coating.

FIG. 5 illustrates a light ray 19 which penetrates a YAG crystal directly at the right hand boundary of the contact surface (end surface 13) and which upon reflection reaches the right hand boundary. The angle of incidence $\delta_0$ is given by the equation $$\tan \beta_0 = \frac{x}{2b} = \frac{d}{2b \cos \delta}, \qquad (8)$$

wherein $b$ is the side length of the square cross section of the YAG crystal 2 and $d$ is the diameter of the waveguide which is a round waveguide. However, a waveguide with a rectangular, elliptical or oval cross section can be utilized so that the width of the waveguide is equal to the width $b$ of the crystal; however, the dimension $d$ is smaller than $b$. The beam illustrated in FIG. 5 is a boundary case. A re-entry into the light waveguide 1 depends on the location of entry of the beam into the crystal 2 and on the beam angle. If the location of entry into the crystal is statistically distributed, beams with an angle $\beta < \beta_0$ have a greater probability of re-entering the light wave as the value $\beta$ becomes smaller. If it is possible to obtain $\beta < \beta_0$ for all beams, then the difficulties mentioned above do not occur. Therefore, it is advantageous if beams with the limiting angle $\beta_0$ yield as large an angle $\theta_0$ as possible in the light waveguide. Only that portion of the radiation with angles $\theta$ greater than $\theta_0$ is partly insufficiently utilized.

With the equation $$\beta_0 = \frac{\tan \beta_0}{\sqrt{1 + \tan^2 \beta_0}}$$

and $\sin \alpha_0 = (n_2/n_1) \sin \beta_0$, it follows that $$\alpha_0 = \text{arc sin}\left[\frac{n_2}{n_1} \frac{d}{\sqrt{4b^2 \cos^2 \delta + d^2}}\right], \qquad (9)$$

where the angle $\alpha_0$ corresponds to the angle $\beta_0$. The angle $\theta_0$ relative to the axis of the waveguide is then given by $\theta_0 = \delta - \alpha_0$.

A computation of $\theta_0$ with the aid of equation (9) illustrates that for $n_2 = 1.8243$, $n_1 = n_2$ and $d = b$, a maximum value of $\delta_0 = 15.246°$ will occur at $\delta = 63.6°$. This value of $\delta$ lies somewhat below the smallest value of $\delta_g$ (see Table I). If value $b/d > 1$ is selected by using an elliptical or rectangular waveguide cross section, a more favorable value of $\theta_0$ will result. Since the maximum of $\theta_0$ is not very strongly defined and the above relation is significant only for a small portion of the beams traveling in the waveguide, it is advisable to select the value of $\delta$ according to equation (6).

The efficiency of the arrangement is significantly better than in the case of pumping from the side and the arrangement has advantages as compared with the end pumped laser because a greater number of diodes can be used.

In FIG. 2, the beam 15, which travels parallel to the axis of the waveguide is illustrated. This beam 15 penetrates the crystal 2 with an angle $\beta'$ whereby $$\sin \beta' = n_1/n_2 \sin \delta. \qquad (10)$$

This direction represents the main beam direction. If the absorption length (a drop in intensity to $e^{-1}$) is designated by a, then $d_a = a \sin \beta'$ (13) wherein $d_a$ (FIG. 2) is the length of the crystal required for a light wave to travel the length of path $a$ in the crystal 2.

It can be assumed that $d_a$ corresponds to the crystal length which can be pumped by means of a coupling. It must be noted that $d_a$ is independent of crystal thickness $b$. Thus, if $b$ is reduced, the volume in which the supplied pump power is absorbed is then also reduced. However, as $b$ becomes smaller, the critical difficulties with beam re-entering the light waveguide increases. Table II illustrates some characteristic values for $a = 4.3$ mm, $n_2 = 1.8243$ and $n_1$ corresponding to Table I.

Table II

| $\delta = \delta_g$ (Degree) | $\beta$ (Degree) | $d_a$ (mm) |
|---|---|---|
| 66.5 | 66.5 | 3.9 |
| 70 | 63.7 | 3.9 |
| 75 | 60.3 | 3.7 |
| 80 | 57.4 | 3.6 |
| 85 | 53.9 | 3.5 |

According to the equation (13) and Table II, the value of $d_a$ are smaller than $a$. Since in the case of an end pump laser the crystal length which can be pumped by a diode is approximately equal to $a$, this means that the pump capacity in the described arrangement is absorbed in a smaller volume. This makes it possible to achieve a higher population inversion at a given energy density of the diode and represents an additional advantage of the inventive arrangement.

In FIG. 6, YAG-Nd-laser 2 which has a crystal dimension of 0.7 mm × 0.7 mm × 7 mm is illustrated and has a volume of V = 3.43 mm³. The crystal 2 is illustrated as being pumped by four non-illustrated diodes and its length is approximately 2 $d_a$. The pumped radiation is supplied from each of the four diodes by light waveguides 1, 4, 5 and 6 which have a diameter of 0.7 mm.

In the embodiment illustrated in FIG. 7, the four diodes create light indicated by the four arrows and instead of using glass rods as the light waveguides, small prisms 7, 8, 9 and 10 are utilized as the light waveguides and are disposed on the laser crystal 2 to receive the pumping energy. The diodes may be mounted on a base support so that when the YAG rod with the prisms attached is placed on the base support the prisms are optically coupled with the diodes.

It is also possible to pump significantly longer lasers with a greater number of diodes. For example, two diodes for each crystal segment which has the length $d_a$.

Although various minor modifications may be suggested by those versed in the art, it should be understood that I wish to employ within the scope of the patent granted hereon, all such modifications as reasonably and properly come within the scope of my contribution to the art.

I claim:

1. In a pumping arrangement for optically pumping a solid state laser, said arrangement comprising a laser rod, and at least one pumping light source having nearly point form with the improvement comprising a light waveguide arranged between each pumping light source and the laser rod, each light waveguide having an optical axis extending at an angle δ to a normal of the surface of the laser rod with the angle δ having a relationship of $$2 \arcsin(1/n_1) \leq \delta < \pi/2,$$

wherein $n_1$ is the index of refraction of the light waveguide.

2. In a pumping arrangement according to claim 1, wherein each light waveguide is a glass rod.

3. In a pumping arrangement according to claim 1, wherein each light waveguide is a prism.

4. In a pumping arrangement according to claim 1, wherein the laser rod has a rectangular cross section and wherein each light waveguide is coupled to a portion of the surface of the laser rod.

* * * * *